United States Patent [19]

Harper

[11] Patent Number: 4,718,534
[45] Date of Patent: Jan. 12, 1988

[54] COLLATING CONVEYOR FOR BAGGED PRODUCTS

[75] Inventor: Chester H. Harper, Aurora, Oreg.

[73] Assignee: Allen Fruit Co., Inc., Newberg, Oreg.

[21] Appl. No.: 896,977

[22] Filed: Aug. 15, 1986

[51] Int. Cl.[4] ............................................. B65G 47/24
[52] U.S. Cl. .................................. 198/401; 198/409;
198/416; 198/423; 198/424; 198/462;
198/464.2; 414/107
[58] Field of Search ............... 198/401, 374, 406, 407,
198/409, 410, 411, 412, 416, 422, 423, 424, 429,
431, 462, 463.3, 464.2, 468.01, 468.9; 414/50,
46, 107, 108; 53/542

[56] References Cited

U.S. PATENT DOCUMENTS

| | | | |
|---|---|---|---|
| 2,519,491 | 8/1950 | Monoco | 198/462 |
| 2,941,676 | 6/1960 | Harker | 198/412 X |
| 3,090,504 | 5/1963 | Britton et al. | 414/108 |
| 3,445,980 | 5/1969 | Salomon . | |
| 3,516,532 | 6/1970 | Calistrat | 198/374 |
| 3,590,972 | 7/1971 | Mosterd . | |
| 4,135,616 | 1/1979 | Pellaton | 198/423 |
| 4,356,906 | 11/1982 | Fallas | 198/462 X |
| 4,398,383 | 8/1983 | Prakken | 53/542 X |

Primary Examiner—Robert J. Spar
Assistant Examiner—Lyle K. Kimms
Attorney, Agent, or Firm—Chernoff, Vilhauer, McClung & Stenzel

[57] ABSTRACT

A belt conveyor system carrying bagged product toward a packing station is interrupted and offset downward to form the basis of an automatic collating station for placing the bags in a column, side-by-side and upright, for easier packing into a carton. A rearwardly inclined guide surface at the offset between the upper and lower conveyor portions begins the erection of each bag as it is discharge by the upper conveyor portion and slides down into contact with the lower conveyor portion. Automatic sensing of a bag in this position actuates a reciprocating erector platen which emerges from the guide surface and tilts the bag forward against a previously erected bag. Further automatic sensing of this new forward tilted position of the bag actuates forward indexing of the lower conveyor to make room for the next bag. Then automatic retraction of the erector permits the next bag to be delivered into the collating station.

3 Claims, 6 Drawing Figures

U.S. Patent
Jan. 12, 1988
4,718,534
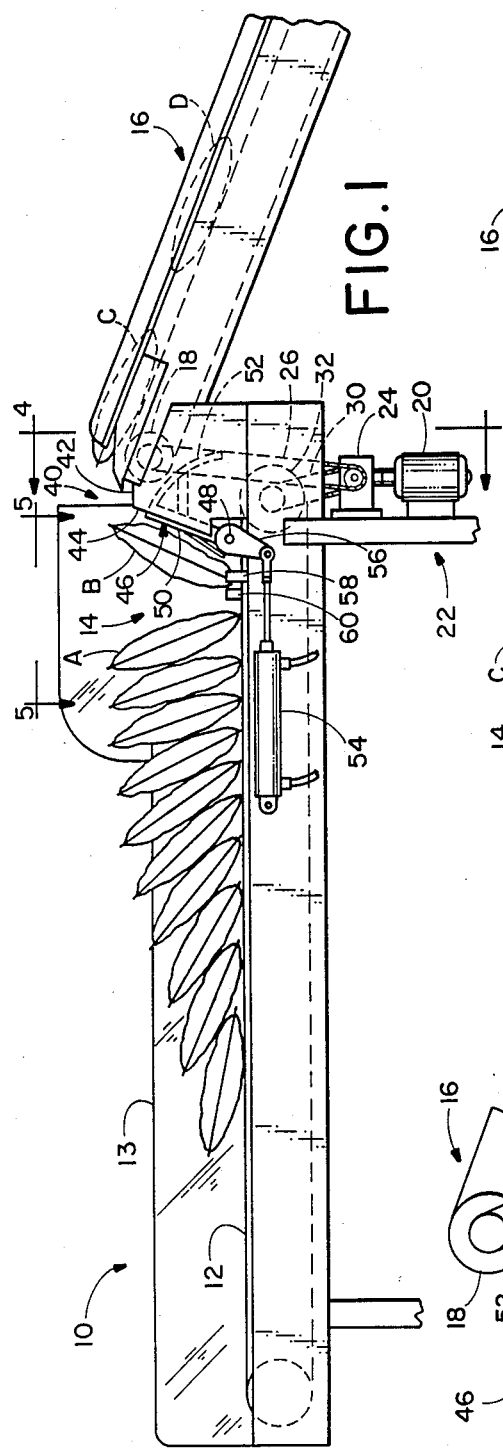
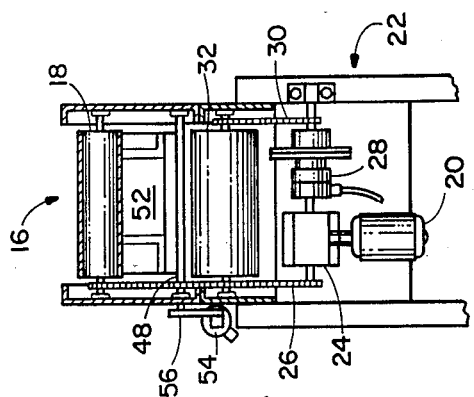
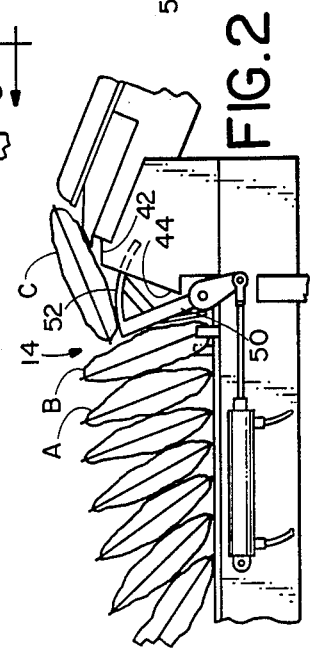
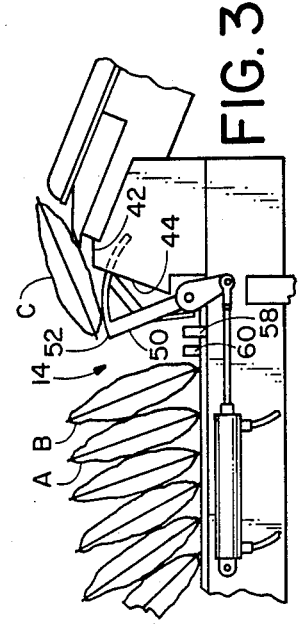
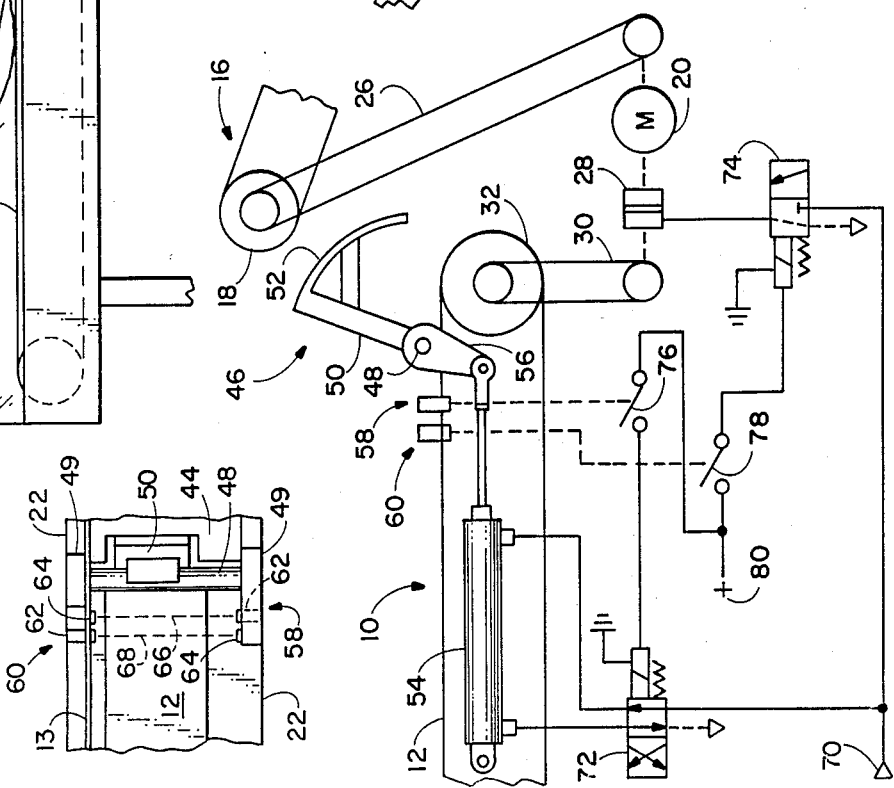

COLLATING CONVEYOR FOR BAGGED PRODUCTS

BACKGROUND OF THE INVENTION

The invention concerns conveyors which include means for reorienting and respacing the articles being conveyed. More particularly, it concerns a collating conveyor arrangement suitable for handling relatively flat, generally rectangular, filled and closed flexible walled bags, and which receives the bags spaced apart and lying flat and delivers them in a collated upright column.

A collating operation is commonly used in preparing bagged product for shipment. Typically, the bags are received from an automatic bagging machine, conveyed spaced apart and lying flat in edge-to-edge relationship. Collation brings the bags together, generally upright in a horizontally extending column, so that successive, multiple-bag portions of the column may be conveniently handled and placed in a shipping container.

The labor cost of manual collation is relatively high and, if the product is fragile, there is a risk of damage from operator error or carelessness. Collation of bagged products which are not easily damaged, and hence able to stand some pressure in the process, is readily mechanized as shown, for example, in Harker U.S. Pat. No. 2,941,676. The collated column may be assembled in a delivery chute as in Harker, or on a takeoff conveyor (preferably intermittently driven) as disclosed by Mosterd U.S. Pat. No. 3,590,972. The chute arrangement, exemplified by Harker, is suitable for bagged product which can tolerate some deformation and pressure. Maintenance of the collated arrangement depends on friction between the bags and the sides of the chute and the collated column is advanced along the chute only by the pressure of the platen as it adds another bag to the column. Salomon U.S. Pat. No. 3,445,980 also uses a "pushed" column in a chute (for tea bags), but here feeding pressure is applied to the column through the camming action of the "wings" of a star wheel feeder rather than by a platen. When a takeoff or delivery conveyor is used, as in Mosterd, the collated product is handled more gently. However, Mosterd is designed especially for handling objects, such as egg trays, where an inversion operation is required before the handling of bagged product.

Fallas U.S. Pat. No. 4,356,906 recognizes some features desirable in a collating conveyor for handling more delicate bagged products, such as potato chips in plastic or waxed paper bags. The system should cope with the irregular arrival of bags at the collating station; any erecting device must be gentle; in the collated column, the bags must be together but not crushed; and the erecting device must not interfere with or damage oncoming bags, especially if they arrive while the preceding bag is being erected or reoriented. In Fallas, the feed and takeoff conveyors are in approximately the same horizontal plane (actually the takeoff conveyor is somewhat elevated) and longitudinally aligned. The collating mechanism includes a generally horizontal erecting table which connects the conveyor portions and slidingly supports each bag while a "flipper" or erector arm lifts it upright, through an angle in excess of 90°, while moving it to the downstream end of the table adjacent the takeoff conveyor. From there it is pushed onto the takeoff conveyor either directly by the flipper or by the arrival of the next bag. Fallas finds it necessary to use a four-bar linkage and approximately 135° of rotation of his drive mechanism to carry his flipper from its approximately horizontal attitude, emerging from the collating unit table at its upstream end, to its upright and upwardly extending position towards the downstream end, followed by a further 225° of rotation to retract the erector beneath the surface of the table into position ready for the next cycle, all of which requires an excessively long cycle time.

Sensed arrival of a bag at the upstream end of the Fallas collating table actuates the flipper for one cycle. Intermittent drive of the takeoff conveyor is synchronized with the flipper action by virtue of being driven by the flipper mechanism so that the takeoff conveyor belt is advanced or indexed during the flipper action rather than after the action is completed. Accordingly Fallas provides no "backup" to guard against bags in the column falling backwards due to acceleration at the start of indexing.

Fallas provides means for adjusting the distance advanced or indexed by the takeoff conveyor for each collating cycle, but during operation this distance is fixed. Improper takeoff conveyor stroke adjustment or variation in thickness or shape of the bags may therefore result in poorly collated columns which are irregular because of crowding (with potential damage to the product) or unevenly or extensively spaced. Accordingly, Fallas suggests an alternative in which "the stroke of the ratchet assembly (driving the takeoff conveyor) might be made to be adjustable during operation of the machine". However this would require monitoring and careful adjustment. The problem of both Fallas and Mosterd in this regard is that they rely on upstream detection to signal actuation of the takeoff conveyor (and the collating erector mechanism in Fallas). There is no feedback of the actual position or condition of the existing collated column on the takeoff conveyor to control its actuation.

SUMMARY OF THE INVENTION

Accordingly, it is a principal object of the invention to provide, in a bagged product conveying system, an automatic collating arrangement which inherently has a relatively fast cycle time, which collates uniformly and without damage regardless of variations in the dimensions of bags and in the spaced intervals between them as they arrive at the collating unit, and which insures that the bags do not tilt backward after being collated.

In a preferred embodiment, the collating conveyor system includes a feed conveyor having a discharge end and a normally stationary takeoff conveyor having a receiving station substantially underlying the feed conveyor discharge end, and a nearly upright, rearwardly sloping guide surface extending between them. Thus, a bag discharged by the feed conveyor slides freely downward, controlled by the guide surface, directly into the collating area and onto the takeoff conveyor to be supported there, already partially erected but leaning somewhat rearwardly against the guide surface.

An erector plate or platen normally resting substantially flush with the guide surface is mounted for reciprocating rocking motion about a lower transverse pivot axis and is operable to move between its resting position and a forwardly inclined position in which it places the bag just received against the column of previously collated bags.

An actuator for the erector is responsive to a sensor system which senses the arrival of a bag in the collating area. The sensor system also actuates the drive of the takeoff conveyor to index the collated column of bags downstream and provide space for a following bag, but preferably only after the bag has been tilted forward into its erected collated condition. Preferably, the sensor system includes first and second sensors with nonoverlapping ranges so that the actuations of erector forward tilting, takeoff conveyor indexing, and erector retraction are substantially sequential rather than simultaneous. In this way, at least during the initial indexing movement of the takeoff conveyor, the erector "backs up" the collated column, preventing the bags from tilting or falling backwards due to the acceleration of the conveyor. Indexing of the takeoff conveyor stops when the upstream end of the collated column (the last bag) is beyond the range of the sensor system.

The erector structure may include an upper, somewhat horizontal intercepting surface which is exposed and effective when the erector is in the forward tilt or erected position. Thus, if the succeeding bag arrives early at the feed conveyor discharge end, it is supported and delayed by the intercepting surface, to be released into the collating area only upon retraction of the erector.

An important advantage of the collating conveyor system according to the invention is more uniform and reliable collation despite nonuniformity of bag dimensions because the collation cycle is variably controlled by directly sensing conditions at the collating area rather than fixedly controlled by relying on purely mechanical synchronization of the cycle or relying upon upstream conditions such as sensing of the arrival of another bag to initiate a collating cycle. The system is thus variably self-regulating, and cumulative indexing distance error is thereby avoided.

The particular vertically offset juxtaposition of the feed conveyor discharge end and the takeoff conveyor receiving station allows the bags to assume a partially erected position in the course of delivery from the feed conveyor and minimizes the required oscillating stroke of the erector. This compact arrangement has the potential for fast cycle times because of the small angle and distance through which a bag must be erected, enabling a reciprocating driving mechanism of relatively simple, light, economical construction.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a simplified side view, with certain parts removed for clarity, of an exemplary bagged product conveyor arrangement embodying the invention, with a bag just having been delivered to the collating area.

FIGS. 2 and 3 are partial views similar to FIG. 1 showing later stages in the collating process. In FIG. 2 the collating erector has been actuated to tilt the same bag forward. In FIG. 3 the takeoff conveyor has been indexed forward to provide space for a next bag, shown supported atop the erector which is about to be retracted.

FIG. 4 is a partial sectional view taken approximately on line 4—4 of FIG. 1 showing, principally, the drive arrangement for the conveyors.

FIG. 5 is a semi-schematic partial top view taken approximately on line 5—5 of FIG. 1 showing the photosensor arrangement at the receiving station of the takeoff conveyor.

FIG. 6 is a partial schematic of the collating erector and the takeoff conveyor drives with a simplified circuit diagram of their control arrangement.

DESCRIPTION OF THE PREFERRED EMBODIMENT

The invention is embodied in a conveyor system, the general arrangement of which is shown in FIG. 1, for conveying bagged product from a conventional bagging machine (not shown) to a packing station where the bags are removed manually in collated columns and placed in cartons.

The endless belt conveyors of the system are generally conventional and include a takeoff conveyor 10 with a belt 12 and a sidewall 13 along one side of the belt for carrying bags of product, such as the exemplary bags A and B, shown in FIG. 1. Bag B is at the receiving station or collating area 14 of the takeoff conveyor. On the feed conveyor 16, bags of product, such as exemplary bags C and D, are carried flat and spaced apart. The feed conveyor's delivery-end drum 18 is spaced above and somewhat upstream or rearward of the receiving station 14 of the takeoff conveyor.

The conveyors are driven by a common electric motor 20, carried by the frame 22 of the takeoff conveyor 10, through a bevel gear box 24. Drive to the feed conveyor 16 is direct, by drive chain 26 to the delivery-end drum 18. But, in the case of the takeoff conveyor 10, an air-actuated, normally disengaged clutch 28 is interposed between the gear box 24 and a drive chain 30 which completes the drive to the receiving-end drum 32 of the takeoff conveyor 10.

Adjacent the collating station 14 is a hoodlike structure 40, supported by the takeoff conveyor frame 22, which, as well as offering some shielding for drive components, provides transverse guide surfaces which play a part of the collating operation. These are a shelf or shoulder 42, extending approximately horizontally and somewhat below the top of the delivery-end drum 18 of the feed conveyor and a rearwardly inclined bag guiding surface 44 extending downwards from the shelf 42 to adjacent the upper run of the takeoff conveyor belt 12. The surface 44 is cut out to provide clearance for an oscillating erector assembly 46, rigidly attached to a transverse rockshaft 48 carried just above the takeoff conveyor belt 12, immediately upstream of the receiving station 14 of the conveyor, and journaled in bearings located in housings 49 carried by the frame 22.

In the rearward or retracted position of the erector assembly 46, as shown in FIG. 1, a guide face or platen 50 of the erector assembly is approximately flush with the rearwardly inclined guide surface 44. Forward movement of the erector assembly 46 exposes a curved, transversely extending erector top support surface 52 extending rearwardly from the upper edge of the platen 50 and generally circumferentially with respect to the rockshaft 48. Reciprocating movement of the erector assembly 46 is controlled by a double-acting pneumatic cylinder 54 through a bellcrank 56, rigidly connected to the rockshaft 48.

Turning now to the control system for the collating arrangement and referring particularly to FIGS. 5 and 6, key elements are a pair of sensors or detectors, in this case reflective photosensors, 58 and 60, respectively, at the collating station 14. Their senders and reflectors, 62, 64, respectively, are fixedly mounted on the takeoff conveyor frame 22 on opposite sides of the belt 12 and positioned just downstream of the base of the erector assembly 46 (rockshaft 48) so that their light beams, 66, 68, respectively, extend parallel to each other across and just above the belt 12. Other types of sensors, such as proximity optical sensors, may alternatively be used, but they should be capable of being spaced relatively closely and still function independently.

Pneumatic power for the operation of the cylinder 54 and the clutch 28 is provided by a conventional pneumatic power source 70 by way of conventional solenoid-operated directional control valves, 72, 74, respectively, subject to normally open relay switches 76, 78. The switches 76, 78 are, in turn, responsive to the photoelectric sensors 58 and 60. A conventional electrical power source 80 powers the directional control valves 72, 74. Power source and control of the electric drive motor 20 are conventional and not shown.

In operation, the motor 20, and hence the directly driven feed conveyor 16, runs continuously. The bagging machine (not shown) at the lower, input end of the conveyor 16, deposits a series of generally rectangular bags lengthwise on the feed conveyor and, as shown in FIG. 1 by exemplary bags C and D, they are carried flat and spaced apart in an edge-to-edge relationship. The bags are discharged by the feed conveyor at its delivery-end drum 18 and, guided by shelf 42 and rearwardly inclined guide surface 44, each bag is delivered into a nearly upright but rearwardly inclined position, resting on the takeoff conveyor belt 12 and supported by the guide surface 44, as exemplified by the position of the bag B in FIG. 1. As indicated in FIG. 1, a bag in this position breaks the light beam 66, closing the switch 76 and actuating valve 72 to extend the cylinder 54 so that the erector assembly 46, pivoting about the rockshaft 48, pivots forward and erects the bag B into a forwardly inclined position, juxtaposed and face-to-face with already collated bag A, as shown in FIG. 2.

As also shown in FIG. 2, a bag, such as B, in this newly collated position, breaks the light beam 68 of the second photosensor 60, closing the switch 78 and actuating valve 74 to actuate the clutch 28 so that the takeoff conveyor belt 12 is powered, carrying or indexing the collated column of bags forward. Note that indexing starts only after the erector has finished its function of placing the bag into a forwardly inclined position with the erector face 50 "backing up" bag B, thus preventing it and the rest of the column from tilting backwards upon initial acceleration of the belt 12.

When a condition is reached, as indicated in FIG. 3, where the photosensor light beams 66 and 68 are again unbroken, switches 76 and 78 once more open, interrupting power to the directional control valves 72, 74, whose return springs return them to the condition shown in FIG. 6. This returns the erector assembly 46 to its rearward position and interrupts indexing of the conveyor belt 12. Thus, the drive to the takeoff conveyor is intermittent and the belt 12, as shown in FIG. 3 by the new position of bag B, has been indexed forward only a distance sufficient to provide the predetermined space for a following bag, i.e. a variable distance determined by gauging from the upstream face of the collated column. This avoids the cumulative indexing error which may occur when a fixed (mechanically synchronized) indexing interval is used which does not match variable bag dimensions. In FIG. 3, the takeoff conveyor belt 12 has stopped as described and the erector assembly 46 is beginning to retract to allow following bag C to assume the position previously occupied by bag B, as shown in FIG. 1.

As indicated in FIGS. 2 and 3, bag C has already been discharged by the feed conveyor 16 during actuation of the erector assembly and is no longer being propelled by the feed conveyor since it is effectively clear of the feed conveyor delivery drum 18. However, the bag C is temporarily and statically supported by the shelf 42 and the top surface 52 of the erector assembly. The average spacing of the bags on the feed conveyor 16 is normally such that a collating cycle will have been completed and space provided for the next bag before a following bag is discharged by the feed conveyor. The condition indicated in FIGS. 2 and 3 is that of premature arrival of a bag at the collating station due to unusually close spacing on the feed conveyor. The top surface 52 of the erector assembly, assisted by the shelf 42, delays the drop of the following bag until indexing of the takeoff conveyor is at least substantially complete, thus avoiding jamming the system.

Thus, it can be seen that a collating arrangement according to the invention is simple and compact. Gravity-initiated erection, due to the fact that the discharge end of the feed conveyor 16 is more elevated than the receiving portion of the takeoff conveyor belt 12, leaves only a small tilting movement for completion by the erector assembly 46. This requires only a simple, reciprocating mechanism for the erector assembly such as the pneumatic cylinder 54 and rockshaft 48 of the present embodiment, which is capable of very fast action and thus facilitates rapid cycling. Self-regulation of takeoff conveyor indexing in variable, rather than fixed, increments deriving from the downstream sensor arrangment, ensures that an adequate, but not excessive, predetermined space is provided at the collating station for the arrival of each bag so that it can be tilted onto the collated column without damaging pressure and without space between collated bags. Indexing of the takeoff conveyor after, rather than during, erector actuation, and maintenance of the erector assembly in its erecting position until after indexing of the takeoff conveyor has commenced, insure that indexing does not cause the collated bags to tip backward.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A collating conveyor arrangement for bagged product, comprising:
   (a) a feed conveyor on which individual bags of product are carried forward;
   (b) an intermittently movable, forwardly indexing, takeoff conveyor;
   (c) collating erector means interposed between the feed and takeoff conveyors for assisting in the transfer of bags between the conveyors and erecting them, one at a time, by forward movement of the erector means while the takeoff conveyor is stationary into a forwardly inclined position on the takeoff conveyor so as to assemble a collated column of bags on the takeoff conveyor;

(d) means for sensing the arrival of a bag on the takeoff conveyor be sensing the presence of said bag in a rearwardly inclined position on said takeoff conveyor and generating a first signal in response to sensing said arrival;

(e) erector actuation means included in the erector means, for actuating the erector means into said forwardly inclined position in response to said first signal;

(f) actuator means for commencing each forward indexing movement of the takeoff conveyor in response to the completion, by said erector means, of the erection of each bag into said forwardly inclined position;

(g) means inclined in said actuator means and located downstream of the erector means, for sensing the completion of erection of each bag into said forwardly inclined position by sensing the presence of each bag in said fowardly inclined position on said takeoff conveyor and for generating a second signal in response to sensing the completion of the erection of each bag; and (h) means included in said actuator means for commencing each forward indexing movement of said takeoff conveyor in response to said second signal.

2. The collating conveyor arrangement of claim 1, further including means for maintaining said erector means in said forwardly inclined position until after said actuator means has commenced said indexing of said takeoff conveyor.

3. The collating conveyor arrangement of claim 2 wherein said erector means has bag intercepting means connected thereto and includes means for reciprocating said erector means and bag intercepting means in unison between a rearwardly inclined position of said erector means and said forwardly inclined position of said erector means, said bag intercepting means including means for holding a bag and preventing its transfer to said takeoff conveyor while said erector means is in said forwardly inclined position.

* * * * *

UNITED STATES PATENT AND TRADEMARK OFFICE
CERTIFICATE OF CORRECTION

PATENT NO. : 4,718,534

DATED : January 12, 1988

INVENTOR(S) : Chester H. Harper

It is certified that error appears in the above-identified patent and that said Letters Patent is hereby corrected as shown below: On the Title page:

In the Abstract:

Line 8,            Change "discharge" to --discharged--

Col. 7, line 2      Change "be" to --by--

Signed and Sealed this

Twenty-seventh Day of December, 1988

Attest:

DONALD J. QUIGG

*Attesting Officer*          *Commissioner of Patents and Trademarks*